(12) United States Patent
Töpfer et al.

(10) Patent No.: US 10,508,478 B2
(45) Date of Patent: Dec. 17, 2019

(54) CONTROL UNIT FOR A CLOSING DRIVE FOR A MOTOR VEHICLE LOCK

(71) Applicant: Kiekert AG, Heiligenhaus (DE)

(72) Inventors: Claus Töpfer, Sindelfingen (DE); Andreas Kind, Tambach-Dietharz (DE); Jan Stötzer, Tambach-Dietharz (DE)

(73) Assignee: Kiekert AG, Heiligenhaus (DE)

( * ) Notice: Subject to any disclaimer, the term of this patent is extended or adjusted under 35 U.S.C. 154(b) by 131 days.

(21) Appl. No.: 15/561,115

(22) PCT Filed: Mar. 22, 2016

(86) PCT No.: PCT/DE2016/100132
§ 371 (c)(1),
(2) Date: Sep. 25, 2017

(87) PCT Pub. No.: WO2016/150433
PCT Pub. Date: Sep. 29, 2016

(65) Prior Publication Data
US 2018/0128023 A1 May 10, 2018

(30) Foreign Application Priority Data
Mar. 25, 2015 (DE) .......................... 10 2015 004 018

(51) Int. Cl.
*E05B 81/24* (2014.01)
*F16H 25/20* (2006.01)
(Continued)

(52) U.S. Cl.
CPC .............. *E05B 81/25* (2013.01); *E05B 81/20* (2013.01); *E05B 81/40* (2013.01); *F16H 25/20* (2013.01); *F16H 2025/204* (2013.01)

(58) Field of Classification Search
CPC .......... E05B 81/20; E05B 81/25; E05B 81/28; E05B 81/40; E05B 81/44; E05B 81/48;
(Continued)

(56) References Cited

U.S. PATENT DOCUMENTS 6,178,837 B1 * 1/2001 Nagai ..................... F16D 55/28
74/89.23
6,655,225 B1 * 12/2003 Nagai ................... F16C 29/008
74/89.33
(Continued)

FOREIGN PATENT DOCUMENTS

DE          100 11 859 A1     9/2001
DE          10320660 A1      12/2004
(Continued)

OTHER PUBLICATIONS

Machine translation of DE 202012004789 U1 obtained on Apr. 3, 2019.*
(Continued)

*Primary Examiner* — Adam D Rogers
(74) *Attorney, Agent, or Firm* — Renner, Otto, Boisselle & Sklar, LLP

(57) ABSTRACT

The invention relates to a control unit (1, 12), comprising a control element (4, 15), particularly for a closing drive of a motor vehicle lock. Said control unit comprises a housing (2, 13), a drive unit, and a spindle gear unit having a spindle nut and a spindle (3, 14). Said spindle gear unit can be driven by the drive unit and the control element (4, 15) can be moved by means of the spindle (3, 14), the control element (4, 15) having a means for guiding the control element (4, 15) in the housing (2, 13) so that the control element (4, 15) can be prevented from rotating about an axis of movement.

10 Claims, 3 Drawing Sheets

(51) Int. Cl.
*E05B 81/20* (2014.01)
*E05B 81/40* (2014.01)

(58) Field of Classification Search
CPC . F16H 25/20; F16H 25/2018; F16H 2025/204
USPC ............ 74/89.23, 89.32, 89.33, 89.36, 89.37
See application file for complete search history.

(56) References Cited

U.S. PATENT DOCUMENTS

| | | | |
|---|---|---|---|
| 8,528,948 B2* | 9/2013 | Bettin | E05B 81/20 |
| | | | 292/201 |
| 9,541,156 B2* | 1/2017 | Blumenthal | B60N 2/0232 |
| 2003/0188644 A1* | 10/2003 | Winter | B30B 1/18 |
| | | | 100/280 |
| 2011/0012380 A1 | 1/2011 | Bendel et al. | |
| 2013/0133448 A1* | 5/2013 | Schroeder | F16H 25/2006 |
| | | | 74/89.32 |
| 2015/0267440 A1* | 9/2015 | Topfer | F16C 1/145 |
| | | | 74/469 |
| 2018/0016822 A1* | 1/2018 | Sturm | E05B 79/20 |
| 2018/0180144 A1* | 6/2018 | Legrand | F16H 25/2252 |

FOREIGN PATENT DOCUMENTS

| | | | |
|---|---|---|---|
| DE | 20 2008 007 310 U1 | 6/2009 | |
| DE | 20 2012 004 789 U1 | 8/2013 | |
| DE | 202013004236 U1 | 8/2013 | |
| DE | 10 2012 218 650 A1 | 2/2014 | |
| DE | 102015100750 A1 * | 7/2016 | ............. E05B 79/20 |
| DE | 102015212643 A1 * | 1/2017 | ......... F16H 25/2252 |
| DE | 102016104910 A1 * | 9/2017 | ............. F16H 25/24 |
| DE | 102007043391 B4 * | 8/2018 | ............. F16H 25/20 |
| EP | 2075395 A2 | 7/2009 | |

OTHER PUBLICATIONS

International Search Report and Written Opinion for corresponding Patent Application No. PCT/DE2016/100132 dated Aug. 16, 2016.
English Translation of Office Action for counterpart Chinese Patent Application No. 2016800176364 dated Nov. 22, 2018.

* cited by examiner

CONTROL UNIT FOR A CLOSING DRIVE FOR A MOTOR VEHICLE LOCK

FIELD OF THE INVENTION

The invention relates to an actuator unit with an actuator, in particular for a closure drive of a motor vehicle latch, having a housing, a drive unit, a spindle gear with a spindle nut and a spindle, whereby the spindle gear can be driven by the drive unit and the actuator can be moved by means of the spindle.

BACKGROUND OF THE INVENTION

In order to facilitate the operation of a vehicle, technical functions are increasingly integrated into the motor vehicle. The user friendliness is increased and malfunctions, such as an unclosed lateral door, can be prevented. A convenience function is that the lateral doors are automatically closed. Closure hereby occurs when the user only lightly closes the lateral door. Consequently, the lateral door latch only reaches a pre-ratchet position from where the lateral door is automatically closed completely. This facilitates operation for the user to the extent that only small forces are required for complete closure of a motor vehicle door. Independent closure can also be advantageous, for example, when large door and/or large sealing pressures are opposed on the doors during closure.

If lateral doors are named here as an example, this shall not apply restrictively, but the actuator unit with the actuating element also relates to other functions in the motor vehicle, such as electromotive closure of a front flap, a tailgate or a sliding door. However, these are in turn also only examples which do not limit the area of application of the actuator unit. Instead, the actuator unit can always be used when forces need to be introduced into a functional unit of a motor vehicle using a Bowden cable. For example, the actuator unit can be part of a closure drive for a motor vehicle latch. By means of the closure unit, a not yet completely dosed lateral door present in the pre-ratchet, for example, can be transferred into a main ratchet.

The pre-ratchet and main ratchet define both safety-related closure positions of a motor vehicle lateral door, in which an incompletely closed door, which is located in a pre-ratchet, for example, needs to be maintained in this open position. The lateral door is then fully closed in the main ratchet. The closure drive must dose the door against the force of the surrounding door seal during electrical dosure, whereby according to the size of the door different forces need to be provided by the closure drive.

From DE 20 2008 007 310 U1 a motor vehicle door seal with a locking mechanism and a closure device with an electrical drive has become known, whereby the closure device acts on the locking mechanism of the motor vehicle door latch. Using a lifting mechanism which acts directly on the locking mechanism via a closure pawl, the locking mechanism can be transferred from a pre-ratchet to a main ratchet. The lever mechanism used for this purpose, including the closure pawl, is activated via a spindle drive. The spindle nut in turn is moved over the spindle via a motor with a downstream gearbox. During closure, the spindle nut executes a forwards movement, whereby the locking mechanism consisting of a catch and a pawl is transferred from a pre-ratchet position into a main ratchet position.

From DE 10 2012 218 650 A 1 an actuator unit with an actuator and a drive unit for movement of the actuator and a Bowden cable connected to the actuator have become known. An actuator unit and in particular a closure drive for a motor vehicle latch is revealed, which in turn is equipped with an electrical drive and a spindle gear. The actuator can be connected to the spindle and conducted in the housing in a linear manner. A Bowden cable is connected to the actuator, so that the Bowden cable core can be operated by means of the spindle and the actuator. A locking mechanism can be transferred from a pre-ratchet into a main ratchet by means of the Bowden cable, for example, whereby a tensile force can preferably be transferred to a motor vehicle latch by the actuator or the closure drive.

A problem present in the further development of motor vehicle latches or actuator units or closure drives is that, on the one hand large forces need to be transmitted and on the other hand a distortion of the actuator should be prevented. Distortion of the actuator should be executed in such a way where possible that, on the one hand, safe conduction of the actuator is guaranteed and, furthermore, transmission of the forces which is as optimum as possible by the actuator needs to be guaranteed. This problem is complicated by the fact that the automotive industry is striving towards making motor vehicles lighter overall.

SUMMARY OF THE INVENTION

The task of the invention is to provide an improved actuator unit with an actuating element. Furthermore, it is a task of the invention to provide an actuating unit with an actuator which has distortion protection for the actuator, and is simultaneously able to guarantee optimum force transmission from the actuator to the means of force transmission connected to the actuator.

The task is solved according to the invention by the characteristics of the claims. It is pointed out that the exemplary embodiments described hereafter are not restrictive; instead, any possible variations are possible of the characteristics described in the description and the claims.

The task of the invention is solved by an actuator unit being provided with an actuating element, especially for a closure drive of a motor vehicle latch, having a housing, a drive unit, a spindle gear with a spindle nut and a spindle, whereby the spindle gear can be driven by the drive unit and the actuator unit can be moved by means of the spindle, and whereby the actuating element has a means for guide the actuating element in the housing so that distortion of the actuating element around a movement axis can be prevented. The design of the actuator unit according to the invention now creates the possibility of providing an improved actuator unit which directly prevents distortion of the actuating element. Conduction of the actuating element in the actuator unit housing offers the possibility of securely positioning the actuating element in a linear manner over the entire movement route and guide it in the housing. Furthermore, by means of a linear conduction over the movement route in the housing, on the one hand, uniform force transmission can be enabled during movement of the actuating element and, at the same time, the actuating element can serve to prevent distortion for a Bowden cable connected to the actuating element, for example. Furthermore, the actuating element can serve as a bearing point for the spindle.

The actuator unit encompasses a housing, accommodating at least the actuating element, the spindle, the spindle gear and the drive unit. The drive unit is preferably an electromotor which engages with a worm into the spindle nut, for example, so that a rotational movement of the spindle nut can be attained. If the electromotor of the drive unit is driven, the spindle nut thus moves, which in turn results in a linear movement of the spindle. The spindle is moved backwards and forwards in the spindle nut, so that simultaneously the actuating element attached to the spindle executes a movement in the actuator unit housing. The actuator unit serves as a closure drive for a motor vehicle latch, for example, whereby, for example, a tailgate latch can be automatically closed. The actuating element can be directly or indirectly connected to a means of closure on the latch for this purpose. The actuating element is preferably connected to a Bowden cable which in turn interacts with a motor vehicle latch.

In one embodiment of the invention, the actuating element is conducted in the housing in a form-fitting manner. A form fit can be cost-effectively manufactured and also offers the possibility of a constant contact surface over the linear displacement path of the actuating element. The form fit preferably does not change over the travel path of the actuating element. Equal dimension forces can thus be executed at any time to move the actuating element by means of the housing. A form fit also offers the possibility of executing equal dimension contact surfaces for the actuating element on the housing. It is conceivable that the actuating element is formed with two opposite plane-parallel surfaces which, in turn, are conducted in plane-parallel surfaces of the housing. In addition to the two plane-parallel surfaces lying opposite one another, two further surfaces can be formed on the actuating element which are also formed opposite one another in the shape of a segment of a circle. In this case, the actuating element would have two circular segment-shaped surfaces and two plane-parallel surfaces so that a cross-sectional surface would be available which can be described as rectangular in the broadest sense. This rectangular cross-sectional surface would then be available as a contact surface in the actuator unit housing as a contact surface for linear displacement of the actuating element in the housing.

In a further embodiment, the housing has at least a recess, in particular a groove, whereby the actuating element has an elevation corresponding to the recess so that the actuating element can be conducted into the groove. It is constructionally simple to form a recess in the housing and it thus offers a cost advantage. However, the recess can also be formed in such a way that an additional distortion protection is molded into the recess. In particular, an undercut can be thought of here, so that the actuating element is conducted with an undercut by means of a groove-shaped recess, whereby reliable distortion protection can be executed. Furthermore, the formation of at least a groove offers the advantage that the actuating element cannot be installed incorrectly. Even in a design in the form of two grooves arranged in a displaced manner incorrect installation of the actuating element can be prevented, at least with an asymmetrical construction. Alternatively, it is of course also conceivable that the actuating element has a recess and the housing contains an elevation in which the actuating element can be conducted in a linear manner over the entire travel path of the actuating element.

If the housing has at least two different recesses, a further embodiment of the invention thus results, whereby the actuating element has elevations corresponding with the recesses so that the actuating element can be conducted into the recesses. Two different recesses offer the advantage of a distribution of the load engagement points and in particular the possibility to distribute moments acting on the actuating element on the different recesses. Furthermore, different recesses are an advantage in relation to installation safety. Recesses and corresponding elevations also offer the advantage that according to stress and the torque to be incorporated, play tolerances can be set on the actuating element or between the housing and the actuating element. Low tolerances increase the frictional moment, but offer the advantage of great position securing.

In a further embodiment of the invention, the actuating element has at least an involute toothing which is conducted in a corresponding recess of the housing. Involute toothings on the actuating element offer the possibility of transferring a load to the housing as optimally as possible. If, for example, linear contact points are formed between the actuating element and the housing in the case of an actuating element which can be described as rectangular, with formation of the actuating element in the form of an involute-shaped toothing it is possible to produce a planar adjacency between the actuating element and the housing. A planar adjacency of the actuating element offers the advantage of maximum force distribution of a torque acting on the actuating element, so that the frictional values are minimized between the actuating element and the housing.

Even if an involute-shaped toothing is spoken of specially here, according to the invention it is of course also conceivable to form other known forms on the actuating element and housing from the toothing technology of gearwheels. Advantageously, conscious initiation of a distortion of the actuating element can be executed by means of a groove but also by means of an toothing.

If a Bowden cable is firmly connected to the actuating element, for example, and if the Bowden cable is distorted within the scope of its operation, for example on its outermost engagement point, during closure or adjustment, and should the Bowden cable be distorted also during adjustment to minimize the stress of the Bowden cable, grooves and/or toothings thus offer the possibility of bringing the actuating element specifically to an angular movement over the travel path. An angular movement of the actuating element over the travel path is distinguished from a distortion in the form of an unwanted distortion of the actuating element by external forces, for example, which act on the actuating element which would be prevented or unwanted. However, it is also conceivable that a lever mechanism is directly connected to the actuating element which should also execute an angular rotational movement during activation. In this case, the grooves or recesses act as distortion protection on the one hand in order to prevent undesirable rotational movements of the actuating element; however, on the other hand there is the possibility of moving the actuating element specifically around an angle amount over the travel path.

If the guide means are regularly distributed on the circumference of the actuating element, a further embodiment of the invention thus results. A regular arrangement of the guide means offers the advantage of facilitating uniform distribution of the torques initiated into the actuating element. The same forces then act between the actuating element and the housing at every site on the actuating element. Furthermore, regular guides distributed on the circumference are easy to produce and are therefore cost-effective. A regular formation of guides hereby also enables the actuating element to be installed quickly as joining aids or exact alignment of the actuating element can be dispensed with. By means of uniform adjacency of the guide means regularly formed on the circumference, the load can be distributed uniformly and wear can thus be minimized.

If five involute toothings and a rectangular toothing are arranged on the circumference of the actuating element, which are guided in corresponding recesses of the housing, a further embodiment of the invention thus results. This embodiment of the invention combines the advantages of involute toothing with the advantage of clear positioning of the actuating element in the housing. The tolerances can be set, incorrect installation can be prevented and maximum contact surfaces can be executed for between the actuating element and the housing, so that initiation of a moment which is as optimum as possible can be facilitated between the housing and the actuating element. This constitutes a preferred embodiment of the invention.

If the actuating element and the spindle are formed as a single component, a further embodiment of the invention results. The single-component formation of the actuating element and spindle enables easy manufacturability and simultaneously offers the advantage of maximum force transmission between the spindle and the actuating element. In particular where the actuating unit needs to produce high tensile forces, an optimum force flow of the spindle in the direction of the actuating element is advantageous. By means of a suitable formation in the transitional area between the spindle and actuating element, an optimum force line course can be guaranteed to initiate a force of the actuating unit to a Bowden cable on the actuating element, for example.

At least the actuating element and the spindle are made of plastic in an advantageous embodiment. Plastic offers the advantage of good malleability and combines this advantage with the advantage of light weight. Furthermore, plastics can easily be further processed and are cost-effective to manufacture. A preferred material is Polyoxymethylene (POM).

In one embodiment, the actuating element is connected to a Bowden cable. The connection between the actuating element and a Bowden cable hereby enables the execution even of distant activations by means of the actuating unit and also offers the advantage that forces can be deflected. The actuating unit can initiate great forces and in particular tensile forces in a Bowden cable which then are present with suitable guidance of the Bowden cable, for example, in a lateral door latch of a motor vehicle for closure of the latch or the lateral door.

If the guide means of the actuating element stretch along the housing, so that a linear movement of the actuating element can be enabled, a further embodiment of the invention results. The spindle drive generates a linear movement so that a linear movement of the actuating element is enabled. If the guide means along the housing and in particular are formed identically or uniformly along the housing, constant distortion protection can thus be provided for the actuating element over the entire travel path of the actuating element. In particular, the frictional forces between the actuating element and the housing can be determined in advance and are uniform over the entire travel path.

The invention is described in further detail below with reference to the attached drawings on the basis of preferred exemplary embodiments. However, the principle applies that the exemplary embodiment does not restrict the invention but only constitutes an advantageous embodiment. The characteristics portrayed can be executed individually or in combination with other characteristics of the description and also the patent claims individually or in combination.

BRIEF DESCRIPTION OF THE DRAWINGS

The following are shown.

DETAILED DESCRIPTION OF THE INVENTION

Figure 1:
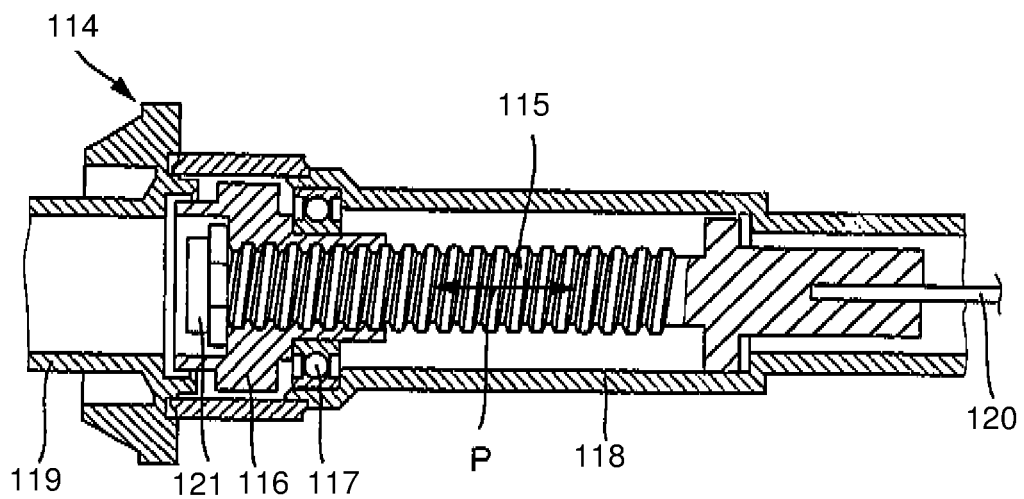
FIG. 1 shows a cross-section through an actuating unit according to the state of the art in the area of the spindle nut, whereby the cut is made through the spindle nut, the housing, the Bowden cable and the actuating element.

FIG. 1 shows a cut through an actuating unit 114 according to the state of the art, as known from DE 10 2015 100 750, for example. The actuating element or spindle 115 is connected to a Bowden cable 120 which is molded to the spindle 115. The actuating element 115 is guided into the housing 118 of the actuating unit 114 for the linear guidance of the actuating element. The actuating unit 114 includes the spindle 115, the spindle nut 116, the bearing 117, the stopping means 121, the housing lid 119, and the housing 118 corresponding to the actuating unit disclosed in DE 10 2015 100 750.

Figure 2:
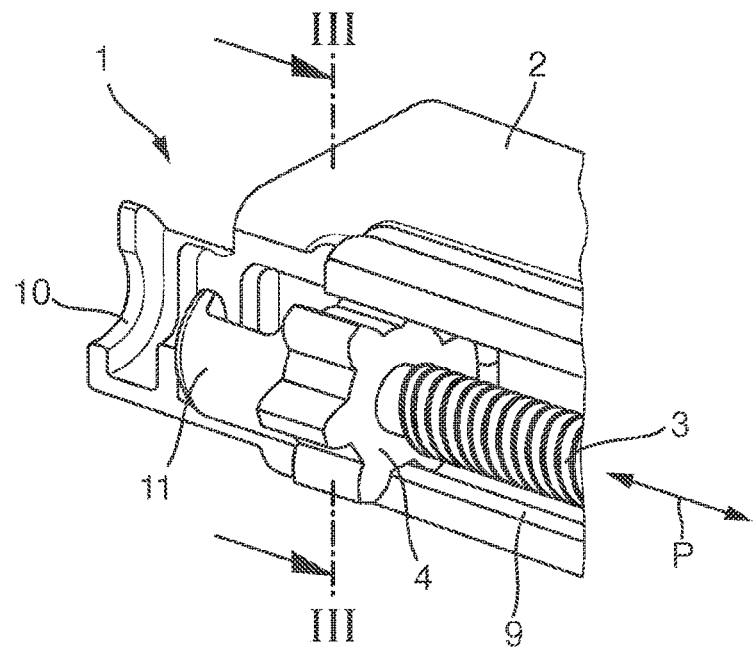
FIG. 2 shows a cut through a housing of an actuating unit, with an actuating element and a component of a spindle.

FIG. 2 shows only a partial area of an actuating unit 1 with a housing 2, a spindle 3 and an actuating element 4. The actuating element 4 is incorporated in the housing 2 in the direction of the arrow P and can be displaced in a linear manner and moved backwards and forwards. The actuating element 4 and the spindle 3 are formed as a single component in this exemplary embodiment.

Figure 3:
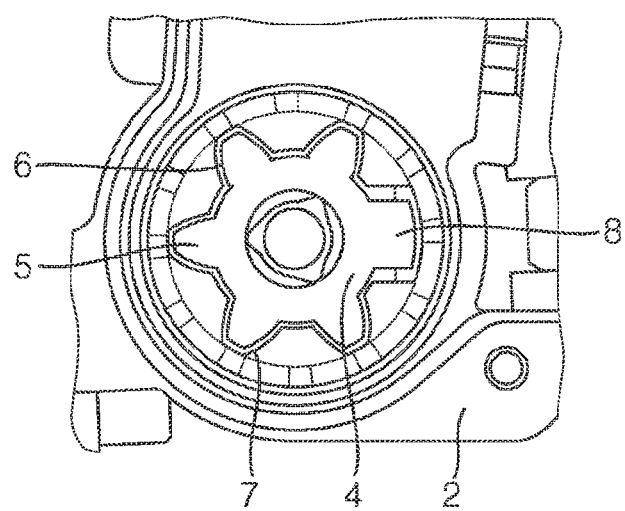
FIG. 3 shows a cut through the housing according to FIG. 2 along the line III-Ill as a top view of the actuating element.

In FIG. 3 the view onto the actuating element 4 from the direction of the arrows III is reproduced in a cut through the housing 2. The actuating element 4 has five involute teeth 5 which are arranged at regular intervals on the circumference of the actuating element. The involute toothing 5 forms large contact surfaces 6 in relation to the recesses 7 in the housing. By means of the formation of the involute toothing 5 large contact surfaces 6 are formed which form 5 planar contact surfaces between the housing 2 and the actuating element 4 due to the lengthwise extension of the toothing apparent in FIG. 2.

In addition to the toothing 5 a tooth 8 which can be described as rectangular is formed on the actuating element. Different elevations 5, 8 or teeth 5, 8 are thus present on the actuating element. The different formation of the gears 5, 8 thus offers the advantage of a large contact surface 6 and simultaneously the advantage of installation safety. Elevations 9 and recesses 7 in the housing 2 form a lengthwise guide for the actuating element 4 extending over the travel path of the actuating element 4.

As is shown furthermore in FIG. 2, the housing 2 also forms a mounting 10 for a Bowden cable and a fixing 11 to mount one end of a non-illustrated Bowden cable core. By displacement of the actuating element 4 in the direction of the arrow P by means of a spindle nut and the spindle 3 the actuating element 4 can be moved in a linear manner. The guidance means 5, 7, 8, 9 thereby act as displacement protection for the actuating element 4.

Figure 4:
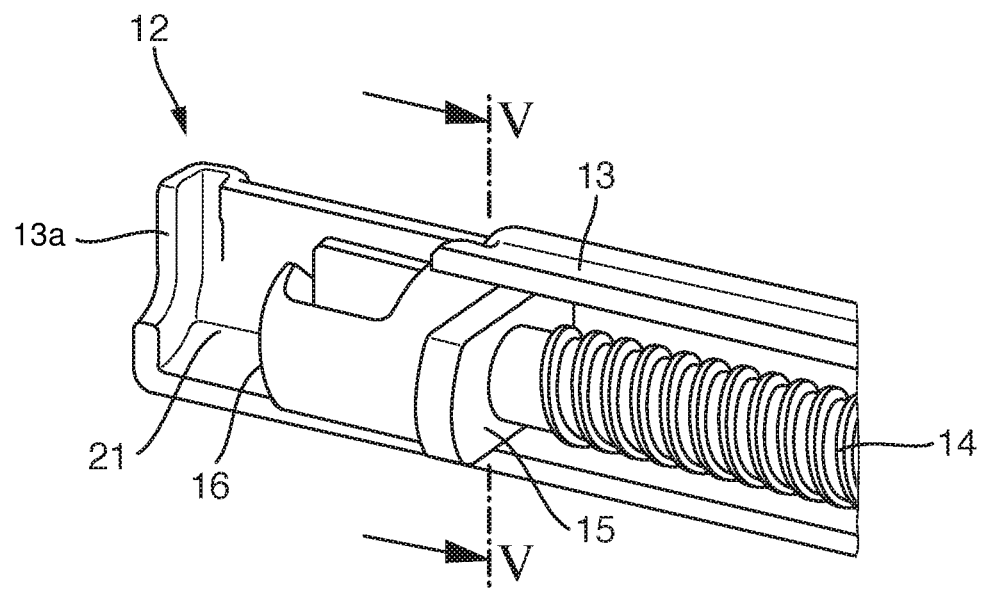
FIG. 4 shows a further embodiment of the invention in a three-dimensional view as a cut through the housing with a spindle and an actuating element.

A further exemplary embodiment of an actuating unit 12 is reproduced in FIG. 4. The actuator unit 12 has a housing 13, a spindle 14 and an actuating element 15. The housing 13 furthermore encompasses a mounting 13a for a Bowden cable and also a fixing 16 for a Bowden cable core. Fixing 16, actuating element 15 and spindle 14 are formed as a single component in this exemplary embodiment.

Figure 5:
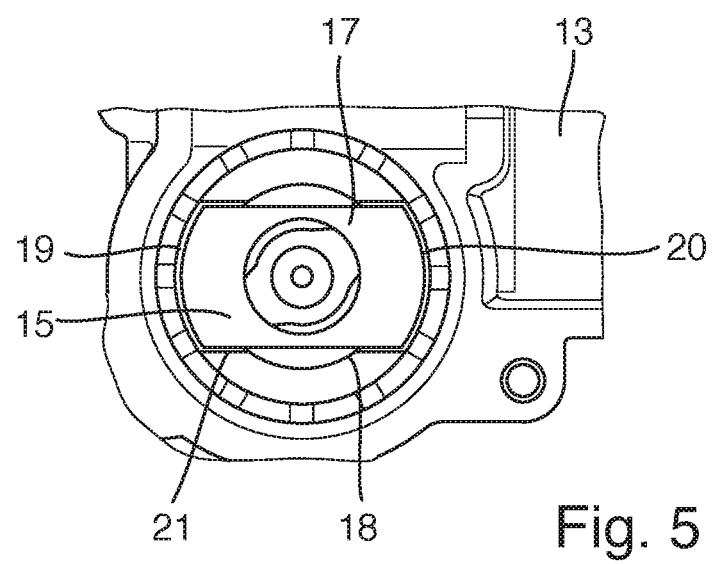
FIG. 5 shows a cut along the V-V line from FIG. 4 as a top view on a rectangular actuating element.

FIG. 5 shows a cut through the housing 13 along line V-V from FIG. 4. The actuating element 15 has two parallel surfaces 17, 18 and two circular section-shaped surfaces 19, 20. The cross-sectional surface of the actuating element 15 can thus be described as roughly rectangular. The plane-parallel surfaces 17, 18 of the opposite sides of the actuating element 15 are supported on guidance surfaces 21 of the housing 13. For the better transparency of the figures, only a guidance surface 21 is equipped with a reference sign. The circular section-shaped surfaces 19, 20 and the plane-parallel surfaces 17, 18 are fully or partly adjacent on the housing. The guidance surfaces 21 act as distortion protection.

The invention claimed is:

1. An actuator unit comprising:
   an actuating element for a closure drive of a motor vehicle latch; housing; and
   a spindle for moving the actuating element, wherein the housing has at least two recesses that have different profiles, and wherein the actuating element has at least three elevations having different profiles that correspond to the different profiles of the at least two recesses for guiding the actuating element in the housing, so that distortion of the actuating element around a movement axis can be prevented,
   wherein the at least three elevations includes at least one elevation having a rectangular profile and at least two elevations that each have an involute profile, and
   wherein the at least two elevations and the at least one elevation are equidistantly spaced along a circumference of the actuating element.

2. The actuating unit according to claim 1, wherein the actuating element is guided into the housing in a form-fitting manner.

3. The actuating element according to claim 1, wherein the at least two recesses are grooves.

4. The actuating element according to claim 1, wherein the involute profile of one of the at least two elevations forms an involute toothing which is in a corresponding one of the at least two recesses of the housing.

5. The actuating unit according to claim 1, wherein the at least two elevations that each have an involute profile are formed as at least five involute toothings and wherein the at least one elevation that has a rectangular profile is formed as at least one rectangular toothing; wherein the at least five involute toothings and the at least one rectangular toothing are arranged on the circumference of the actuating element.

6. The actuating unit according to claim 1, wherein the actuating element and the spindle are formed as a single component.

7. The actuating unit according to claim 1, wherein at least the actuating element and the spindle are made of plastic.

8. The actuating unit according to claim 1, wherein the actuating element is connected to a Bowden cable.

9. The actuating unit according to claim 1, wherein the at least two recesses for guiding the actuating element extend along the housing so that a linear movement of the actuating element can be enabled.

10. An actuator unit comprising:
    an actuating element for a closure drive of a motor vehicle latch;
    a housing; and
    a spindle for moving the actuating element, wherein the housing is configured to guide the actuating element so that distortion of the actuating element around a movement axis can be prevented,
    wherein the actuating element includes five involute toothings and a rectangular toothing that are arranged on a circumference of the actuating element and are guided in corresponding recesses of the housing.

* * * * *